(12) United States Patent
Hardman

(10) Patent No.: US 11,719,654 B2
(45) Date of Patent: Aug. 8, 2023

(54) X-RAY INSTRUMENT WITH AMBIENT TEMPERATURE DETECTOR

(71) Applicant: Evident Scientific, Inc., Waltham, MA (US)

(72) Inventor: Peter Hardman, Waltham, MA (US)

(73) Assignee: Evident Scientific, Inc., Waltham, MA (US)

( * ) Notice: Subject to any disclaimer, the term of this patent is extended or adjusted under 35 U.S.C. 154(b) by 67 days.

(21) Appl. No.: 17/223,353

(22) Filed: Apr. 6, 2021

(65) Prior Publication Data

US 2021/0318255 A1    Oct. 14, 2021

Related U.S. Application Data

(60) Provisional application No. 63/007,487, filed on Apr. 9, 2020.

(51) Int. Cl.
*G01N 23/223* (2006.01)
*G01K 13/00* (2021.01)

(52) U.S. Cl.
CPC ........... *G01N 23/223* (2013.01); *G01K 13/00* (2013.01); *G01N 2223/076* (2013.01); *G01N 2223/20* (2013.01); *G01N 2223/303* (2013.01); *G01N 2223/507* (2013.01)

(58) Field of Classification Search
CPC ........... G01N 23/223; G01N 2223/303; G01N 2223/20; G01N 2223/507; G01N 2223/076; G01K 13/00; G01T 7/005
See application file for complete search history.

(56) References Cited

U.S. PATENT DOCUMENTS

2005/0269513 A1   12/2005   Ianakiev et al.
2014/0048717 A1   2/2014    Tanaka et al.

FOREIGN PATENT DOCUMENTS

| CN | 115443419 A | 12/2022 |
|---|---|---|
| WO | 2019117276 | 6/2019 |
| WO | WO-2021207175 A1 | 10/2021 |

OTHER PUBLICATIONS

English Language Translation for WO-2019117276-A1 (Jun. 2019) Matsunaga et al. (Year: 2019).*
"International Application Serial No. PCT US2021 25938, International Search Report dated Jun. 18, 2021", 5 pgs.
"International Application Serial No. PCT US2021 25938, Written Opinion dated Jun. 18, 2021", 6 pgs.
Pausch, G, "Stabilizing scintillation detector systems: determination of the scintillator temperature exploiting the temperature dependence of the light pulse decay time", IEEE Nuclear Science Symposium Conference Record Rome, Italy, IEEE, Piscataway, NJ, USA, vol. 2, (Oct. 16, 2004), 846-850.
"International Application Serial No. PCT/US2021/025938, International Preliminary Report on Patentability dated Oct. 20, 2022", 8 pgs.

\* cited by examiner

*Primary Examiner* — Jurie Yun
(74) *Attorney, Agent, or Firm* — Schwegman Lundberg & Woessner, P.A

(57) ABSTRACT

An X-ray analyzer comprises at least one detector configured to detect a secondary X-ray from a test object irradiated by an X-ray source, and provide a corresponding energy signal; a temperature sensor configured to sense a temperature related to the detector; and a signal processor configured to process the energy signal and provide a temperature compensated output for an X-ray event.

14 Claims, 8 Drawing Sheets

X-RAY INSTRUMENT WITH AMBIENT TEMPERATURE DETECTOR

CROSS-REFERENCE RELATED APPLICATION

This application claims the benefit of priority to U.S. Provisional Patent Application Ser. No. 63/007,487 filed Apr. 9, 2020, the contents of which are incorporated herein by reference.

FIELD OF THE INVENTION

Example implementations of the present disclosure relate to instruments for making X-ray analysis, more particularly to an X-ray analyzer using an energy dispersive detector operating at a variable ambient temperature without the need of temperature control of the detector.

BACKGROUND OF THE INVENTION

X-ray spectrometer instruments, such as X-ray fluorescence (XRF) instruments, are configured to measure the energy distribution of X-rays emitted from a sample. From the energy spectrum of the emitted x-rays, the chemical composition of the sample material can be calculated. In such instruments, the X-ray energy spectrum is measured with an energy dispersive semiconductor detector in which X-rays incident on the detector generate electron-hole pairs in the semiconductor, and the detector thereby collects an electrical charge which is proportional to the X-ray energy. The charge is received and amplified by a charge sensitive pre-amplifier, such as a Field Effect Transistor (FET), usually located in close proximity to the detector. The charge sensitive pre-amplifier converts the charge from each incident X-ray into a voltage pulse signal whose height is proportional to the X-ray energy. The voltage pulse signal may then be further amplified by one or more second stage amplifiers which are usually located on at least one printed circuit board (PCB) within the X-ray instrument.

Energy dispersive semiconductor X-ray detectors are usually cooled and controlled to maintain a constant low temperature because at ambient temperature the leakage current generated from thermally induced electron-hole pairs in the semiconductor may be too high. The leakage current generates a continuous background noise which varies with temperature and may interfere with accurate measurement of the X-ray generated signal. Cooling to temperatures in the range of −10° C. to −20° C. is usually achieved with a thermo-electric cooling device or the like. However, the requirements to provide cooling and to maintain thermal isolation between the detector and the ambient environment add to the cost and complexity of the X-ray detector. The cooling device needs to be provided with power and, for the cooling to work effectively, the detector needs to be in a vacuum or reduced pressure environment to prevent heat conduction and condensation.

In an instrument having a detector operating at ambient temperature, there is no requirement to provide cooling power. Moreover, the detector does not need to be under vacuum, meaning that the detector window does not have to maintain the typically high level of vacuum. The function of the window in an ambient temperature instrument is only to keep light, dust and moisture away from the detector chip, and to let in x-rays. The window can then potentially be made of cheaper materials, and the processing and packaging costs of vacuum encapsulation can be avoided. However, the temperature dependency of the performance of the detectors need to be corrected in order to achieve accurate and repeatable measurement results.

Therefore, there exists a need for an X-ray analyzing instrument in which the X-ray detector does not require cooling and would therefore be significantly smaller, cheaper, and use less power than detectors used in current practice. Removal of the requirement for cooling and producing reliable accurate result would be particularly advantageous for a low cost, hand-held or portable X-ray analyzing instrument.

SUMMARY

In example implementations of the present disclosure, there is provided an X-ray analyzer for determining the elemental composition of a test object. In the example implementations, the analyzer comprises a detector configured to detect a secondary X-ray (for example X-ray fluorescence) from a test object irradiated by the X-ray source and provide a corresponding energy signal. The analyzer also comprises a temperature sensor configured to sense a temperature in close vicinity of the detector. The analyzer further comprises a signal processor configured to process the energy signal and provide a temperature compensated output for an X-ray event.

The energy signal includes a pulse having a pulse height, and the temperature compensated output includes adjustment to the gain of the pulse height according to the temperature. Further the pulse presents an offset caused by temperature induced leakage of the detector, and the temperature compensated output further includes adjustment of the pulse height with an offset according to the temperature.

DETAILED DESCRIPTION OF THE INVENTION

Figure 1:
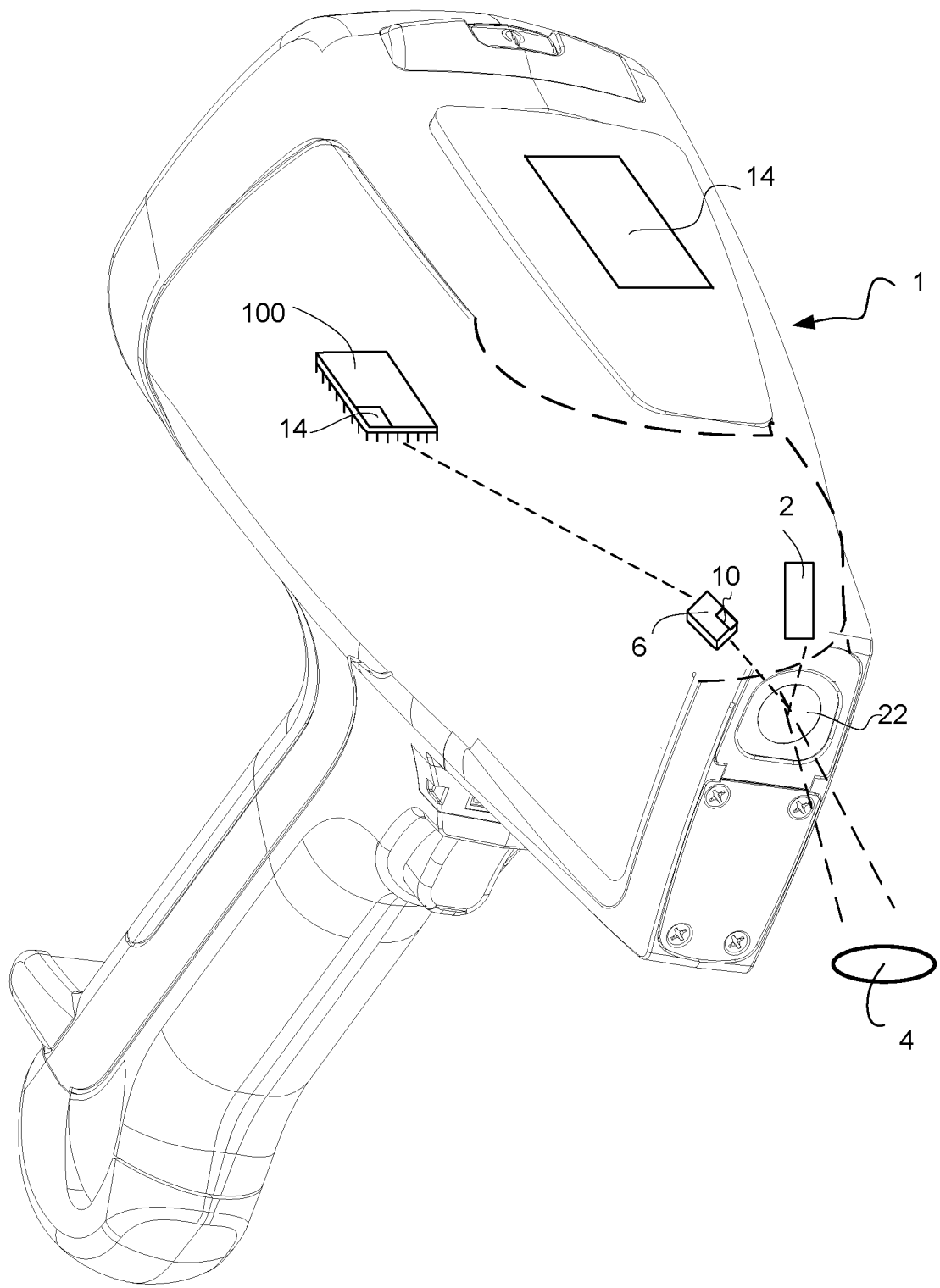
FIG. 1 is a schematic diagram of an example implementation of an X-ray analyzer according to the present disclosure.

Referring to FIG. 1, in an example implementation of the present disclosure there is provided an X-ray analyzer 1 or detection system having an X-ray source 2, and an X-ray detector 6. Preferably, the X-ray detector is a Silicon Drift Detector (SDD) operating at ambient temperature or without axiliary temperature control. The X-ray source is configured to generate primary X-rays to irradiate a test object 4 during an X-ray testing or calibration operation. Detector 6 preferably is configured to detect secondary X-rays emitted from the test object 4 upon being iradiated by the primary X-rays. X-ray analyzer 1 also includes a processor 100. The processor 100 includes hardware, firmware, or software, or any combination of hardware, firmware, and software, collectively for processing energy signals received by detector 6. Processor 100 herein refers to facilities processing all signals and values related to the testing and can comprise discrete or integral electronics or circuitry. X-ray analyzer 1 according to the present disclosure comprises at least one temperature sensor 10. Processor 100 is further configured for correcting the X-ray energy spectrum to account for temperature-induced changes in gain, zero offset and resolution of the electronic pulses produced by the detection system.

In the presently disclosed implementation, temperature sensor 10 is configured to sense a temperature related to detector 6. If detector 6 does not have any cooling or temperature stabilizing facility, the detector's response to secondary X-rays would change and this change would be substantial and dependent on the operating temperature of the detector. For the analyzer 1 to provide an accurate and repeatable reading of spectrum representing of the X-ray response (the secondary X-rays), the changes in detector response due to temperature change are compensated for by processor 100.

Conventional systems do not operate at ambient temperature without a temperature control system and the systems do not compensate for variation of zero offset and resolution.

Table 1 shows an example of a gain set for a pre-amplifier as a function of temperature of a detector. (A pre-amplifier may be used in close vicinity of a detector and may share the same thermal environment as the detector. See FIGS. 6 and 7 for detailed descriptions of example implementations). Note that at temperatures above about minus 20 degrees Celsius (−20° C.) the gain changes quickly, and that between 0° C. and −5° C. the gain is changing by about 1% per degree C. It can be expected that between 0° C. and 20° C. (room temperature), the rate of change of the gain will be even faster. Note also that measurements (not shown) of the temperature dependence of the gain of a typical second stage amplifier located on a printed circuit board (PCB) indicate that the dependence is considerably smaller (about 0.01% per degree C.).

Table 1 shows that there is a general relationship between temperature and gain of a pre-amplifier. The relationship may be an increase or decrease in gain with decreasing temperature. In the implementations disclosed herein, the X-ray analyzer adjusts the gain of pre-amplifier according to change in temperature. The change in resolution is explained later in regard to FIG. 3. The use of preamplifiers and secondary stage amplifiers is later introduced in descriptions related to FIGS. 6 and 7.

TABLE 1

Temperature Dependence of Gain and Resolution

| Temperature (° C.) | Resolution (eV) | Gain |
| --- | --- | --- |
| 0 | 175 | 1621 |
| −5 | 163 | 1700 |
| −10 | 155 | 1748 |
| −15 | 148 | 1781 |
| −20 | 143.5 | 1783 |
| −25 | 141.3 | 1784 |
| −30 | 140.8 | 1786 |
| −35 | 139.9 | 1787 |
| −40 | 139.9 | 1789 |

Figure 2:
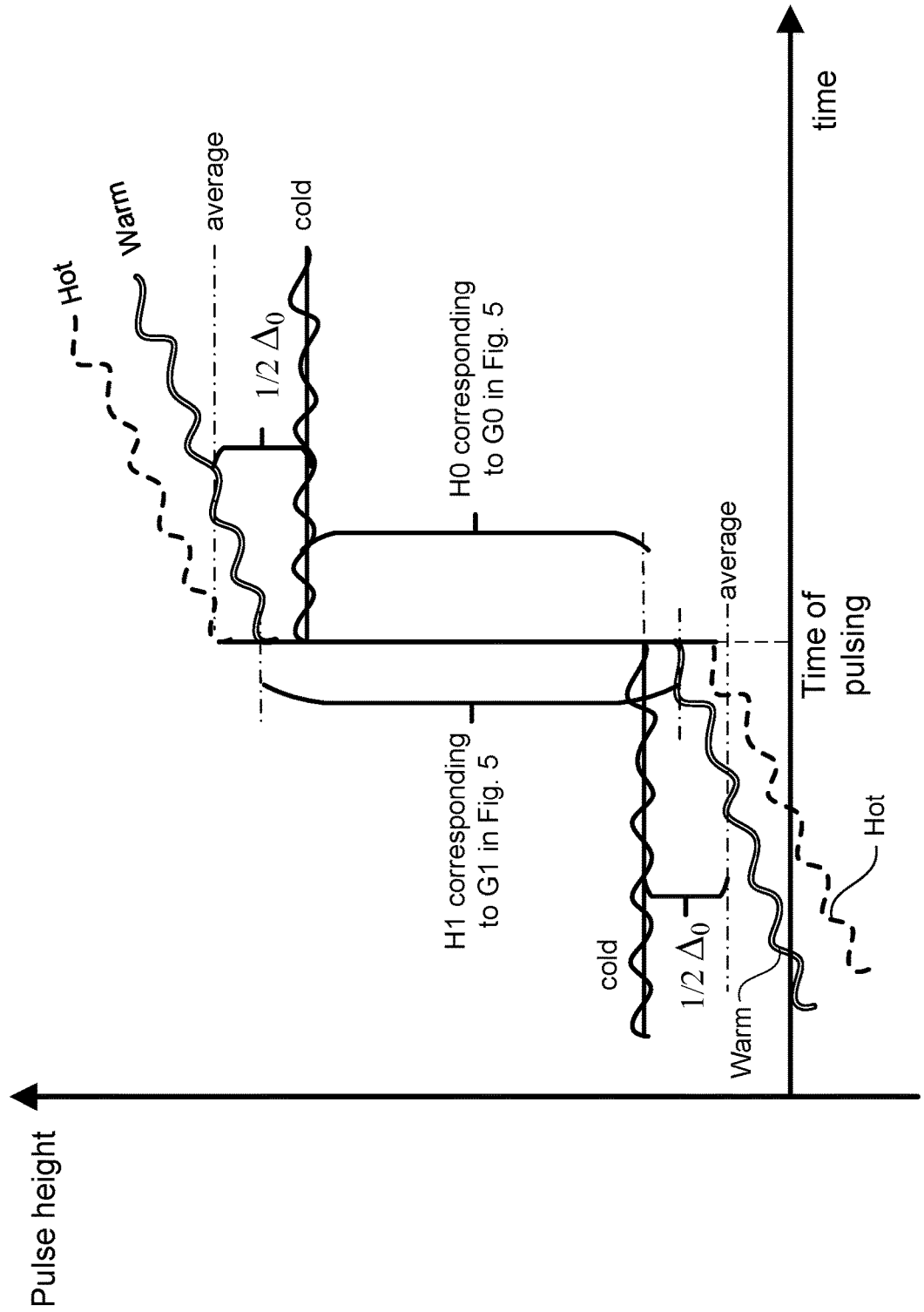
FIG. 2 is a diagram exhibiting changes in the pulse height in association with changes in detector temperature, and the method of deriving temperature compensation according to an example implementation of the present disclosure.

The change in pre-amplifier gain due to temperature may be predicted by empirical measurements such as those shown in Table 1 or FIG. 2, or by theoretical methods. Therefore, if the functional dependence of gain on temperature is observed and if the detector's temperature or pre-amplifier temperature is measured, the gain drift of the system as the temperature changes may be compensated by a dynamic gain correction. In an implementation, the gain may be corrected so that the adjusted gain at all temperatures corresponds to the measured or theoretically predicted gain at a selected standard temperature.

FIGS. 2-5 are presented to explain how a detector's temperature change affects the detector's performance and how compensation for temperature is achieved according to the present disclosure. As can be seen in FIG. 2, the height of the voltage pulse signal generated in a detector by an incident of X-ray is not only proportional to the X-ray energy but is also affected by the detector temperature. The three plots of pulse heights vs. time are conceptually shown for three detector temperatures, one as "cold", one as "Warm" and one as "Hot." As can be seen in FIG. 2, the pulse height is different for all three detector temperatures. For example, H1 and H2 are correspondingly different pulse height for the "cold" detector, and "Warm" detector.

In addition, pulse leakage caused by rising temperature makes the measurement of pulse height "drift" outside the time of pulsing, as seen by the slanted waveforms labeled "Warm" and "Hot." Compensation for the pulse leakage is also preferably considered. A factor related to the pulse leakage is called the "zero offset" which is also temperature dependent. The zero offset in a spectrometer is the signal resulting from a theoretical X-ray of zero energy. Typically, this offset signal is due to the pulse leakage of the detector, which adds a constant contribution to the pulse height. When the detector temperature is allowed to vary, the amount of leakage current, and thus the offset, will also vary. A correction for this effect will improve the accuracy of the spectrum energy scale. For example, if pulse height response for a "cold" detector is used (the temperature of which is used as the calibration temperature), a pulse height adjustment A should be applied for plot "Warm" if the average value of the pulse height is used. One skilled in the art should appreciate, upon reading this disclosure, that values other than average values can be used for such compensation. The implementation of such should all be within the scope of the present disclosure.

It should be noted that the temperature compensation can be performed dynamically at different levels. For the gain correction, X-ray pulses are measured at a known detector temperature and the gain may be corrected at the "lowest" necessary level. Levels of the X-ray detector system where gain correction may occur are, listed from lowest to highest level respectively, the hardware level, firmware level, and software level. At the hardware level, a correction to the gain can be applied in real time to each X-ray as it is measured (e.g., at the field programmable gate array (FPGA) level or at the preamplifier level) by adjusting the gain of the system based on the measured temperature output. At the firmware level, programs can be designed so that when they are executed the programs cause correction to the gain at the microsecond timescale. At the software level, programs can be designed to cause a correction to the gain on a millisecond or longer timescale. Dynamic gain correction may be implemented at any of the levels, the chosen level depending on the rate of change of the detector temperature and the length of the desired measurement. For example, if the detector chip temperature is changing slowly over many seconds, it is unnecessary to correct each X-ray pulse if the whole spectrum is collected in less than 1 second, and in this case occasional gain correction at the software level may be appropriate. If the changes in detector temperature have measurable effects over the timescale of milliseconds, then correction at the firmware or hardware level may be appropriate.

For compensation directly made at the hardware level, one implementation of X-ray analyzer 1 may have circuitry that adjusts amplifier gains in a continuous manner, rather than a discrete manner, directly in response to the change in temperature. The gain adjustment can be linear or non-linear depending on the detector's characteristics in responding to temperature. All such alternative implementations are within the scope of the present disclosure.

Figure 3:
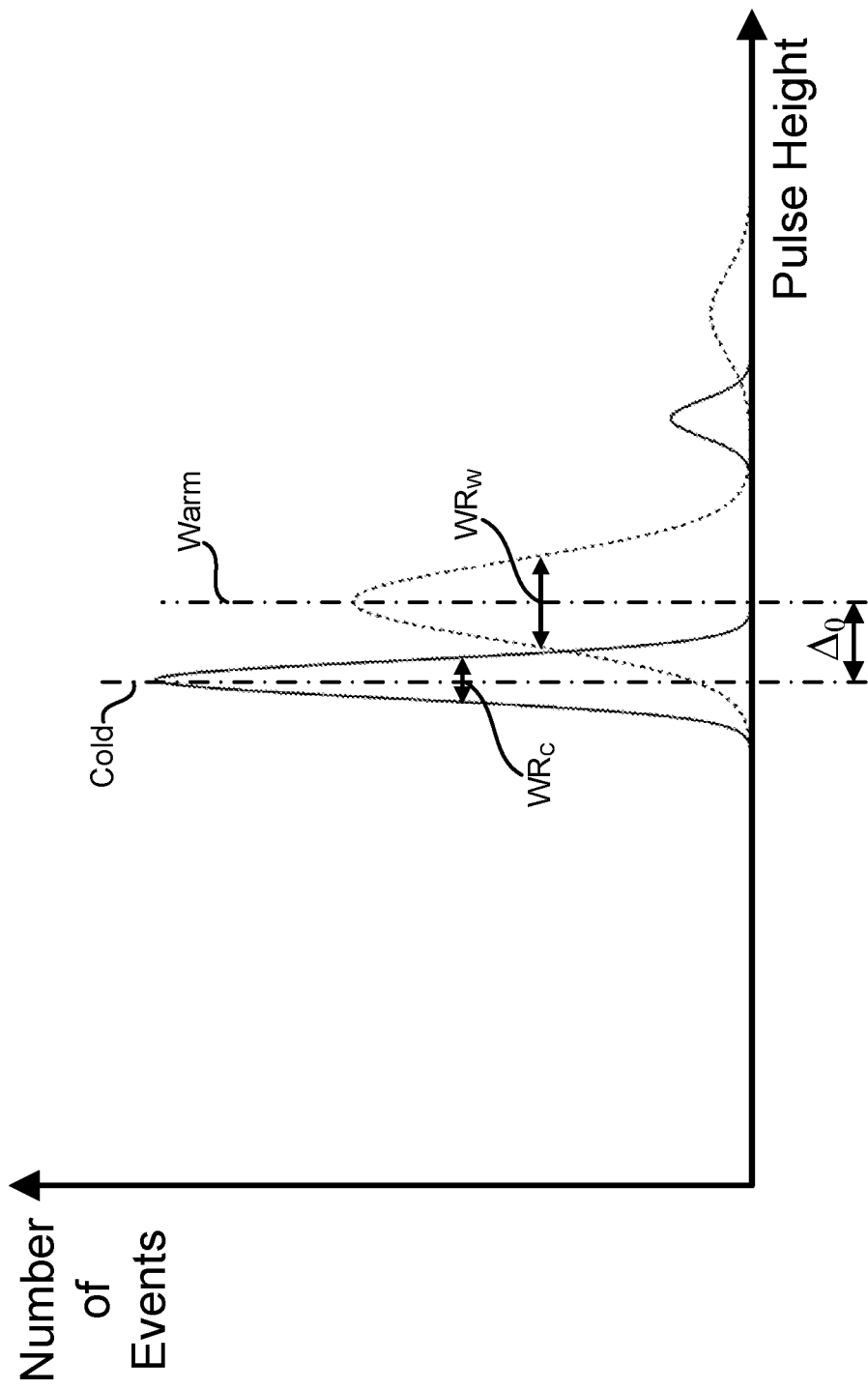
FIG. 3 is a diagram depicting changes in energy signal caused by pulse leakage in association with changes in detector temperature, and the method of deriving temperature compensation according to an example implementation of the present disclosure.

FIG. 3 is a diagram showing a number of X-ray events vs. pulse height as an aspect of the energy signals received by detector 6. As can be seen in FIG. 3, the effect of pulse leakage is shown to be caused by detector temperature change in two responses when the detector temperature is respectively "Cold" and "Warm". In general, the higher the detector temperature, the wider the pulse height distribution. The total area of each event number-pulse height plot is the same for a specific secondary X-ray response. The implementations according to the present disclosure include providing temperature compensation according to the offset $\Delta$ in pulse height change from one temperature to another.

Figure 4:
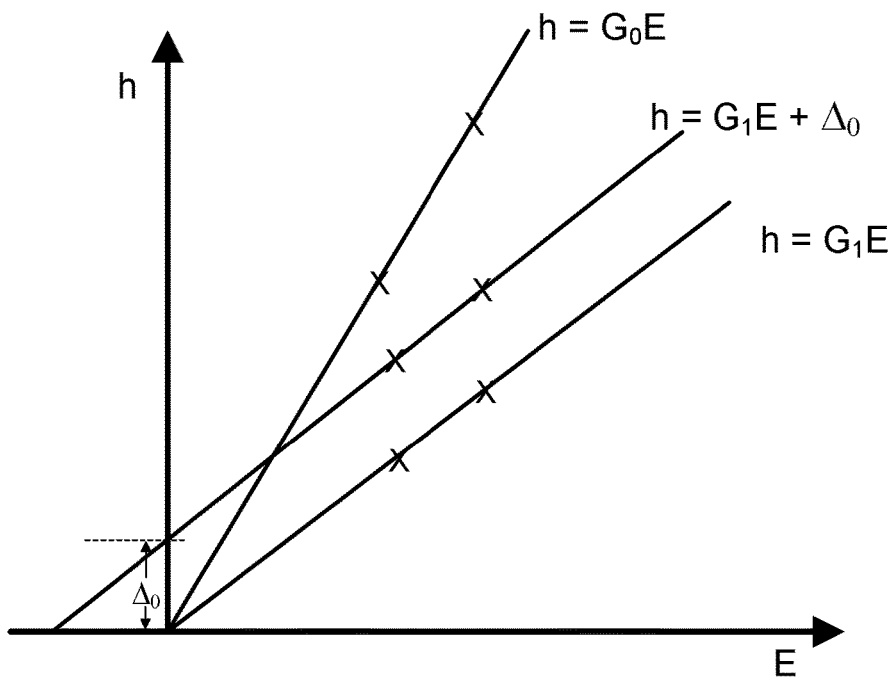
FIG. 4 is a diagram depicting the pulse height as a function of energy, and the method of deriving temperature compensation based on different gain and leakage off-set according to an example implementation of the present disclosure.

FIG. 4 is a graph showing the detector's response in pulse height versus energy for two detector temperatures, $T_0$ and $T_1$. Line $H=G_0E$ represents pulse height vs energy with uncompensated amplifier gain $G_0$ for a detector temperature $T_0$ (temperature for the "cold" detector in FIG. 2), without consideration of zero offset. Line $H=G_1E$ represents pulse height vs energy with compensated amplifier gain $G_1$ for a detector temperature $T_1$ (temperature of the "Hot-1" detector in FIG. 2), without consideration of zero offset. Line $H=G_1E+\Delta_0$ represents pulse height vs energy with compensated gain $G_1$ for a detector temperature $T_1$, further adjusted with a zero offset $\Delta_0$ taking into account the pulse leakage caused by temperature change.

The relationship can be summarized as:

$$H_p = G \times E + \Delta_0 \quad \text{(Eq. 1)}$$

Energy resolution in the field of X-ray analyzers is frequently expressed as full width at half maximum (FWHM) and is given in energy units. In the case of X-ray spectrometry, it is usually in electron-volts (eV). Returning to FIG. 3, energy resolution, represented as $WR_C$ and $WR_W$ for each chart at half height, changes with the change in temperature between a "cold" detector to a "Warm" detector. Change of energy resolution of an instrument is undesirable because energy spectra from the same material may vary depending on the ambient temperature (therefore affecting the detector temperature) at the time of a measurement. Typically, this is because the spectrum is processed using energy ranges to represent X-rays of a particular element. When the resolution worsens, the distribution of measured energies can overlap with other adjacent peaks. This makes it difficult to use data in the overlapping region because it is not possible to determine which peak contributed the signal with a simple region model.

Due to leakage current variations, the energy resolution of the detection system is also temperature dependent. This effect is also shown in Table 1 by measurements of energy resolution of a detector and a pre-amplifier as a function of temperature. The energy resolution increases at a rate of about 1.4% per degree C. at temperatures between 0° C. and −5° C. The energy resolution change is primarily due to the temperature change of the semiconductor detector.

In order to mitigate the effect of change in energy resolution, the dependence of energy resolution on temperature may be predicted by theoretical and empirical methods, and the change in energy resolution may therefore be compensated for by suitable correction algorithms. In an implementation of such a correction algorithm, the spectrum resolution may optionally be artificially altered (broadened) to provide a lower resolution yet still be consistent with its reaction when the detector is warmer (to make $WR_C$ increased to $WR_W$). Preferably, the system is calibrated to the "worst situation" at the highest design temperature. This is because it is easier to broaden the spectrums than to narrow them. In this optional step of calibration, the peaks may be artificially broadened to make the spectrum resolution effectively the same at all temperatures.

Figure 5:
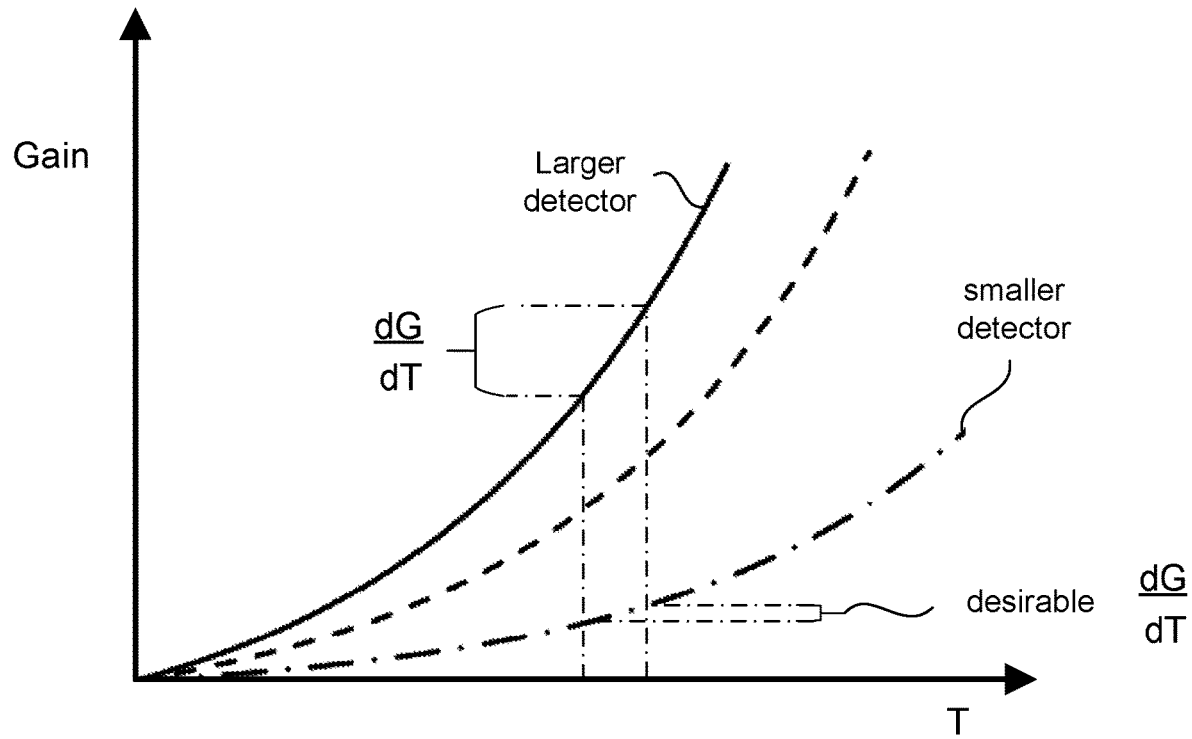
FIG. 5 is a diagram depicting the basis of an alternative implementation by using smaller detectors to achieve desirable range of gain response to detector temperature changes according to the present disclosure.

Referring to FIG. 5, temperature induced gain drift is exponential to the detector temperature change and is severely detrimental to the function of the X-ray analyzers. This is because X-rays of the same energy may generate different output pulse heights depending on the temperature at the time of acquisition, leading to errors in the X-ray spectrum and incorrect elemental analysis of the sample. It is further observed that the smaller the size of the detectors, the less impact of such gain drift. Therefore, in some implementations of this disclosure, the X-ray analyzer is configured to use multiple smaller detectors rather one larger detector to reduce the dependency on temperature change. This can also contribute to the solution of operating the analyzer without a cooling system. If multiple detectors are required, multiple smaller detectors can be part of the solution to negating the cooling system. Smaller detectors may have the advantage of being less sensitive to temperature variations, but smaller detectors may be less efficient due to their smaller area. To compensate for the lower efficiency, an array of small detectors may be used having a total area that approximates the area of the one larger detector.

To summarize, the methods of providing temperature compensation as explained above can be implemented by providing data in tables according to the equations and/or the methods described previously herein. The data tables can be produced during a gain calibration procedure performed prior to operation with the analyzer 1 for different detector temperatures.

Figure 6:
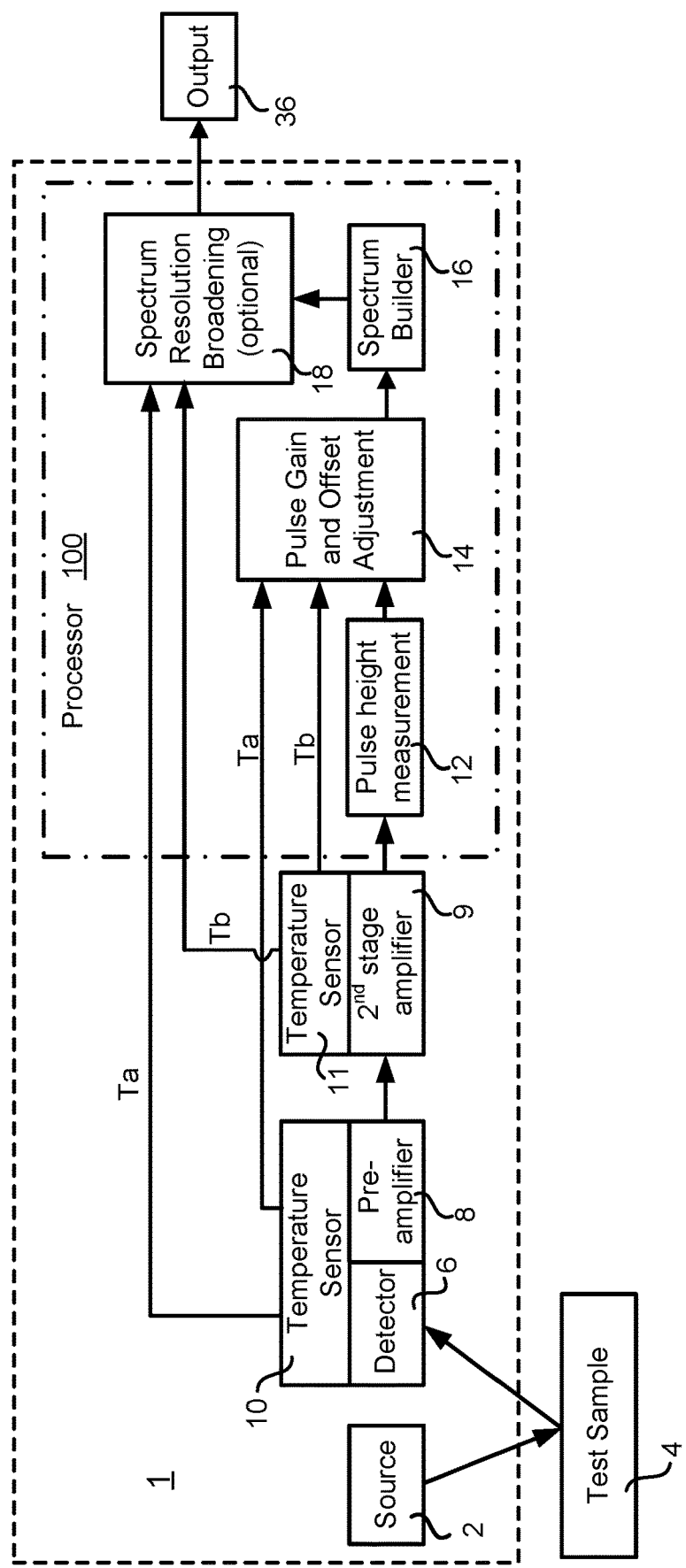
FIG. 6 is a schematic of an X-ray analyzer with a detector and two temperature sensors according to an example implementation of the present disclosure.

FIG. 6 is a block diagram of an example of an X-ray analyzer 1. In the example implementation, the X-ray analyzer further comprises a pre-amplifier 8 and a second stage amplifier 9, all operating without temperature control. Detector 6, pre-amplifier 8, and the first temperature sensor 10 are configured to be packaged in thermal contact with one another. For illustration purposes, temperature sensor 10 outputs a temperature measurement Ta. Second stage amplifier 9 is preferably configured to be on a separate PCB from the pre-amplifier 8 and is in thermal contact with a second temperature sensor 11 outputting a temperature measurement Tb. Temperature sensors 10 and 11 may be of any type of temperature sensing device. In a preferred implementation, temperature sensors 10 and 11 are compact, low cost, solid state sensors such as a thermistors, diodes, or pyroelectric sensors. When X-ray analyzer 1 is in operation, temperature sensor 10 continuously produces temperature measurement Ta representative of the temperature of detector 6 and pre-amplifier 8, and temperature sensor 11 continuously produces temperature measurement Tb representative of the temperature of second stage amplifier 9.

It should be noted that the method of removing temperature dependence of gain, zero offset, and energy resolution explained previously herein in regard to FIGS. 2-4 can be independently applied to gain adjustment for preamplifier 8 and/or secondary stage amplifier 9.

Still referring to FIG. 6, as explained above, the performance of analyzer 1 in terms of measurement accuracy, repeatability and resolution has a significant temperature dependence. This is primarily due to the temperature dependence of the gain of the first stage of amplification because preamplifier or FET 8 is normally temperature sensitive. The temperature dependence of the performance of analyzer 1 is also related to the gain of subsequent amplification stages such as a secondary amplifier 9.

Detector 6 is preferably an SDD because this type of detector has low capacitance so that its energy resolution is fairly good at room temperature. However, other type of detectors may also be used if it meets the expectations of performance over the expected temperature range.

When the secondary X-rays impinge on detector 6, pre-amplifier 8 produces a step-up in output voltage which is input to second stage amplifier 9, which produces a further amplified pulse signal. The amplified pulse signal is input to a pulse height measurement unit 12 configured to measure the pulse amplitude, which is an uncorrected measurement of the X-ray energy. (See FIG. 2 and associated description for an explanation of pulse height). Note that the pulse height measurement unit 12 may also receive measurements from other electronics providing further amplification and/or shaping of the signal from pre-amplifier 9. A pulse gain and offset adjustment unit 14 according to the present disclosure receives the uncorrected energy measurement from pulse height measurement unit 12, as well as temperature measurements Ta and/or Tb from temperature sensors 10 and 11. Pulse gain and offset adjustment unit 14 incorporates the temperature dependence information about the gain, zero offset based on temperature measurements Ta and Tb. The gain and zero offset dependence are explained in detail in the descriptions associated with FIGS. 2-5. The gain calibration procedure may include irradiating detector 6 with a standard energy X-ray source, such as 5.9 keV X-rays from a $^{55}$Fe source, and use the method explained in FIGS. 2-5. With the method described in the present disclosure, calibration can be performed to compare the known pulse height with measured the output of pulse height by using pulse height measurement unit 12 for known temperatures Ta and Tb.

The gain and zero offset dependence information enables pulse gain and offset adjustment unit 14 to apply an adjustment to the output of pulse height measurement unit 12 such that the temperature dependence is removed, and a compensated pulse height is obtained. The adjusted pulse height is therefore independent of temperature and represents the pulse height adjusted to a selected standard operating temperature. The processor 100 then feeds the adjusted pulse height as an input to a spectrum builder 16 which accumulates adjusted pulse heights from multiple X-rays to form an adjusted energy spectrum. Note that, if necessary, for each incident X-ray, pulse gain and offset adjustment unit 14 may acquire separate and individual real-time measurements of temperatures Ta and Tb.

The resolution of the adjusted energy spectrum may still exhibit undesirable temperature dependence. Optionally, a spectrum resolution broadening unit 18 is configured to adjust the energy resolution so that the adjusted energy resolution always corresponds to a known final energy resolution corresponding to a selected fixed temperature. In a preferred implementation, the selected fixed temperature may be the maximum temperature for a measurement or series of measurements. In order to determine the maximum temperature, spectrum resolution broadening unit 18 may optionally receive input of temperature measurements Ta and Tb. Spectrum resolution broadening unit 18 then artificially broadens the resolution of a spectrum acquired at lower temperature in order to match the known resolution at the maximum temperature. The resolution broadening is generally applied by methods known in the art and applied after acquisition of a complete spectrum.

Figure 7:
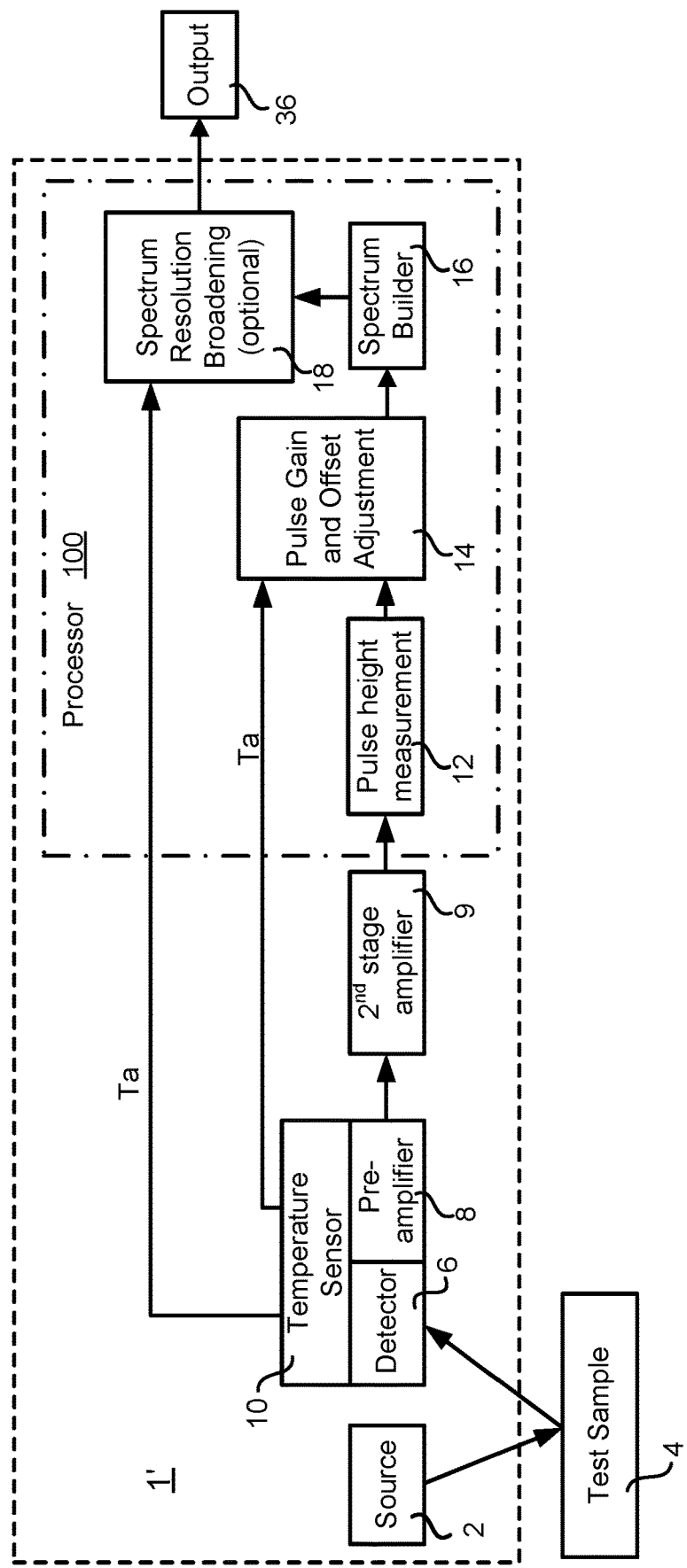
FIG. 7 is a schematic of an X-ray analyzer with a detector and one temperature sensor according to an example implementation of the present disclosure.

As noted above, the temperature dependence of the gain of second stage amplifier 9 located on a PCB is considerably smaller than the temperature dependence of the gain of charge-sensitive pre-amplifier 8 located in close proximity to detector 6. Moreover, the temperature dependences of both the zero offset and the energy resolution are primarily functions of the temperature of the semiconductor material of detector 6. Therefore, a majority part of the temperature dependence corrections derives from temperature Ta, while corrections deriving from temperature Tb are of lesser magnitude. Therefore, FIG. 7 illustrates an example of an X-ray instrument 1 in which the second temperature sensor 11 of FIG. 6 is omitted. Omission of the second temperature sensor in X-ray instrument 1 allows simplification of the instrument, including simplification of the correction algorithms and empirical calibrations which relate to only one temperature variable instead of two temperature variables as in X-ray instrument 1.

Figure 8:
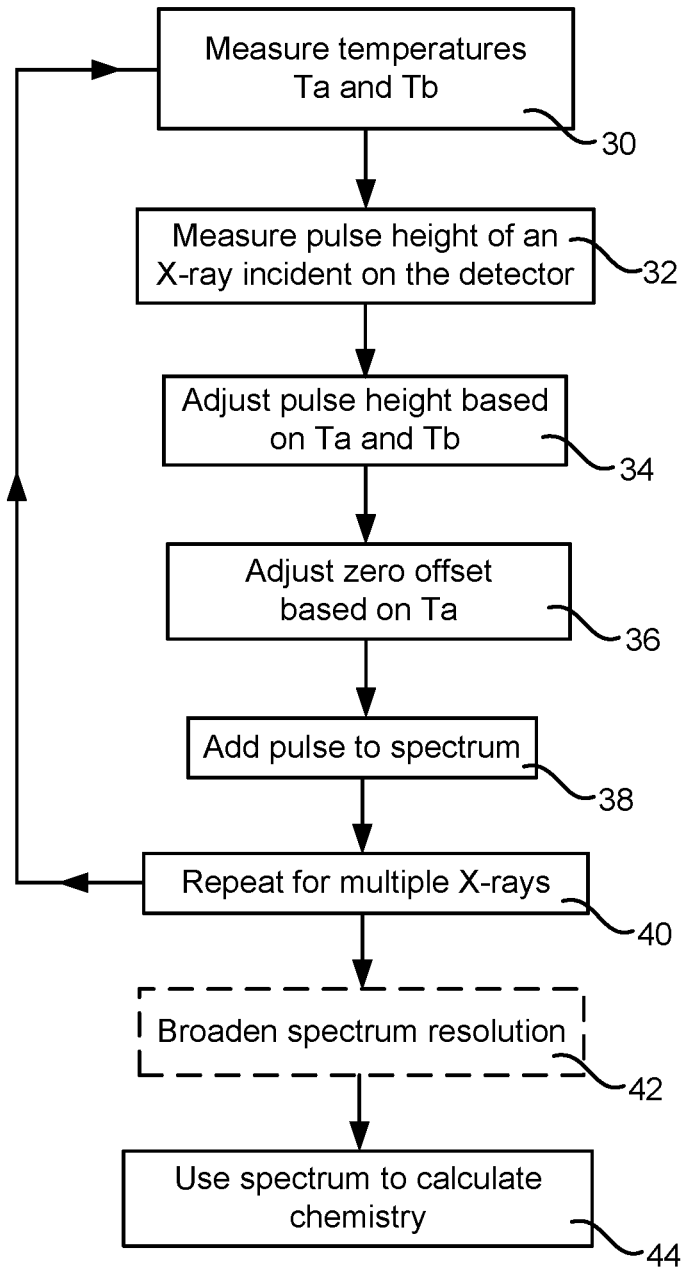
FIG. 8 is a flow chart of a method of devising an X-ray analyzer with at least one detector operating without temperature control according to an example implementation of the present disclosure.

FIG. 8 is a diagram of an example of a method of an X-ray analyzer (e.g., the X-ray analyzer 1 of FIG. 6) conducting a dispersive X-ray analysis without temperature control for its detector. The method of FIG. 8 applies to situations where the measurement is long and/or the ambient temperature is rapidly varying, such that significant temperature change occurs during the course of a single measurement. In step 30, temperature sensor 10 and optional temperature sensor 11 take temperature measurements Ta and optionally Tb from the detector and second stage amplifier, respectively. Steps 32 through 42 of FIG. 8 can be performed by processor 100 in FIG. 6 to implement a temperature compensator. In step 32, pulse height measurement unit 12 measures the pulse height due to an X-ray incident on detector 6. Based on temperature measurements Ta and Tb, pulse gain and offset adjustment unit 14 adjusts the pulse height in step 34. Based on temperature measurement Ta, the zero offset, pulse gain and offset adjustment unit 14 adjusts the pulse height in step 36. In steps 34 and 36, the pulse height and the zero offset are both adjusted to correspond to their values at the selected standard operating temperature, according to Eq. 1 and the method explained in association with FIGS. 2-4. In step 38, spectrum builder 16 adds the adjusted pulse to the spectrum. In step 40, the method of steps 30 to 38 is repeated for multiple X-rays incident on detector 6. In step 42, optionally, after the measurement is ended and a complete spectrum has been acquired, spectrum resolution broadening unit 18 broadens the width of the peaks in the spectrum to correspond to the resolution at the selected fixed temperature. Finally, in step 44 the adjusted spectrum is used to calculate the elemental composition of the test sample.

Figure 9:
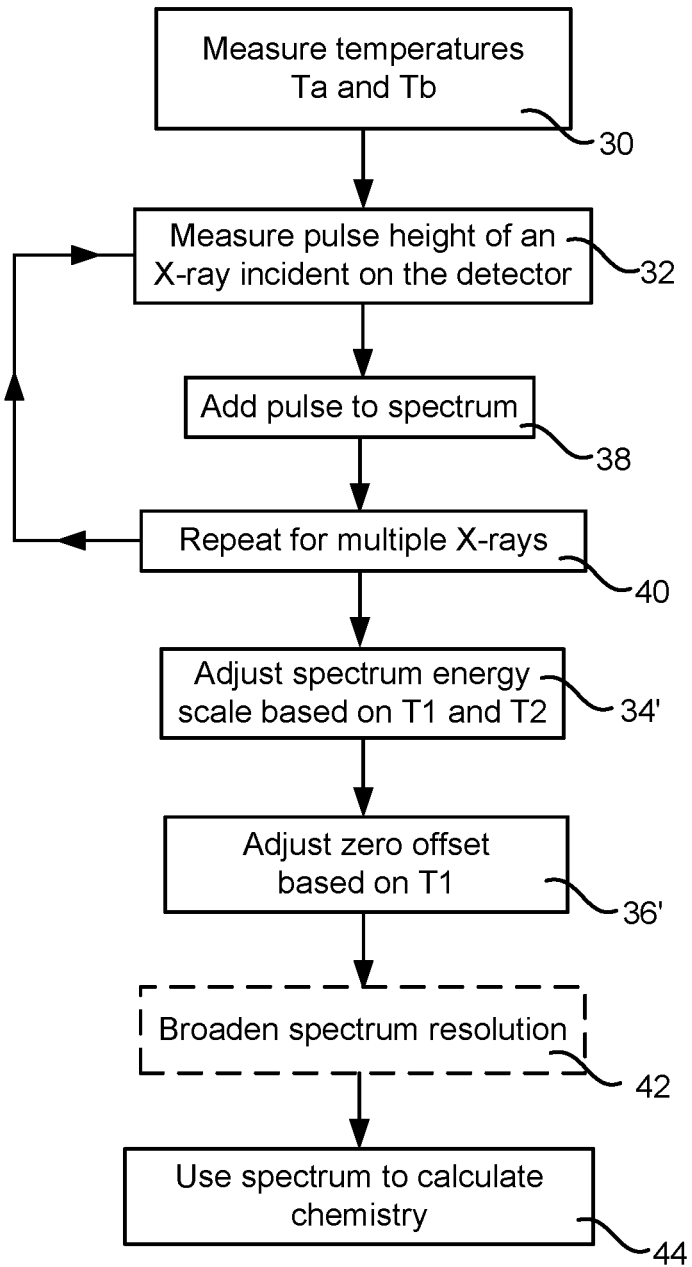
FIG. 9 is a flow chart of an alternative method of operating an X-ray instrument with at least one ambient temperature detector according to an example implementation of the present disclosure.

FIG. 9 is a diagram of an alternative method of an X-ray analyzer (e.g., the X-ray analyzer 1 of FIG. 6) conducting a dispersive X-ray analysis without temperature control for its detector. The method of FIG. 9 applies to situations where the measurement is short and/or the ambient temperature is slowly varying, such that no significant temperature change occurs during the course of a single measurement. In step 30, temperature sensors take temperature measurements of Ta and Tb. Steps 32 through 42 of FIG. 9 can be performed by processor 100 in FIG. 6 to implement a temperature compensator. In step 32, the detector 6 receives the X-ray incident and the pulse height measurement unit 12 measures pulse height. Step 32 is followed by step 38 in which spectrum builder 16 adds the pulse with the measure pulse height. In step 40, the method of steps 32 and 38 is repeated for multiple X-rays incident on detector 6 until the measurement is complete. Thus, a complete spectrum unadjusted for temperature is obtained at completion of step 40.

In steps 34', 36' and 42, the unadjusted spectrum is adjusted to account for temperature variations between different measurements. Based on temperature measurements Ta and Tb, pulse gain and offset adjustment unit 14 adjusts the spectrum energy scale in step 34' to correspond to the measured or calculated energy scale at the selected standard operating temperature. Based on temperature measurement Ta, the zero offset of the whole spectrum is adjusted in step 36' to correspond to the measured or calculated zero offset at the selected standard operating temperature. In step 38', based on temperature measurement Ta, spectrum resolution broadening unit 18 broadens the width of the peaks in the spectrum to correspond to the resolution at the selected fixed temperature. It should be noted that processor of the X-ray analyzer executes steps 34', 36' and 42 according to the method described previously herein in regard to FIGS. 2-4. Finally, in step 44 the adjusted spectrum is used to calculate the elemental composition of the test sample.

Note that use of temperature measurement Tb in the methods of FIG. 8 and FIG. 9 is optional. Thus steps 30, 34 and 34' may be modified to omit reference to temperature measurement T2.

Note also that combinations and variations of the methods of FIG. 8 and FIG. 9 may be used. For example, the method of FIG. 8 may be used with corrections of steps 34 and 36 being applied, not at every pulse, but only after a selected time or after a selected number of pulses. Alternatively, the method of FIG. 9 may be used with the repetition of step 40 occurring, not for the entire measurement, but for a part of the measurement or until a selected measurement time has elapsed.

The flowcharts and block diagrams in the figures may illustrate the apparatus, method, as well as architecture, functions, and operations executable by a computer program product according to various implementations of the present disclosure. Each block in the flowcharts or block diagrams may represent a module, a program segment, a unit or a part of code, which may contain one or more executable instructions for performing specified logic functions. Therefore, the methods described herein are not limited to the specific examples described; rather, any of the method steps may be re-ordered, combined, removed, or performed in parallel or in serial, as necessary, to achieve the results embodying the claims. Further, each block and a combination of blocks in the block diagrams or flowcharts may be implemented by a dedicated, hardware-based system for performing specified functions or operations or by a combination of dedicated hardware and computer instructions.

ADDITIONAL DESCRIPTION AND EXAMPLES

Example 1 includes subject matter (such as an X-Ray analyzer) comprising at least one detector configured to detect a secondary X-ray from a test object irradiated by an X-ray source, and provide a corresponding energy signal; a temperature sensor configured to sense a temperature related to the detector; and a signal processor configured to process the energy signal and provide a temperature compensated output for an X-ray event.

In Example 2, the subject matter of Example 1 optionally includes a signal processor that comprises a temperature compensator.

In Example 3, the subject matter of Example 2 optionally includes a detector that provides an energy signal that includes a pulse having a pulse height, and the temperature compensator is configured to adjust gain of the pulse height according to the temperature.

In Example 4, the subject matter of Example 3 optionally includes a detector that provides an energy signal that includes a pulse having a pulse height that includes an offset caused by temperature-induced pulse-leakage of the detector, and the temperature compensator is configured to compensate the pulse height with an offset according to the temperature.

In Example 5, the subject matter of Example 4 optionally includes a temperature compensator configured to adjust an energy resolution of the output by compensating the pulse height with a broadened pulse width.

In Example 6, the subject matter of Example 4 optionally includes a temperature compensator that includes calibration tables specifying a temperature dependence of the gain and a temperature dependence of the offset.

In Example 7, the subject matter of Example 6 optionally includes calibration tables empirically derived in a calibration procedure in which the test object and the pulse height at a calibration temperature are known.

In Example 8, the subject matter of one or any combination of Examples 3-7 optionally includes a signal processor including a pre-amplifier which is in thermal contact with the X-ray detector, and configured to produce the pulse, and wherein the adjusted gain is a pre-amplifier gain.

In Example 9, the subject matter of one or any combination of Examples 3-7 optionally includes a signal processor including a secondary stage amplifier configured to contribute to the gain and to producing the pulse, wherein the secondary stage amplifier is in contact with a second temperature sensor measuring a second temperature.

In Example 10, the subject matter of one or any combination of claims 1-9 optionally includes a temperature sensor in physical contact with the detector.

In Example 11, the subject matter of one or any combination of claims 1-10 optionally includes an X-ray generator to generate the X-ray source.

Example 12 includes subject matter (such as a method of providing X-Ray testing) or can optionally be combined with one or any combination of Examples 1-11 to include such subject matter, comprising detecting a secondary X-ray from a test object irradiated by source X-rays; providing a corresponding energy signal; measuring a temperature related to the detector; and processing the energy signal and providing a temperature compensated output for an X-ray event.

In Example 13, the subject matter of Example 12 optionally includes providing an energy signal includes a pulse having a pulse height, and the step of processing and providing comprises adjusting gain of the pulse height according to the measured temperature.

In Example 14, the subject matter of Example 13 optionally includes the step of detecting provided by a detector and the pulse includes a zero offset caused by temperature-induced pulse-leakage of the detector, and the step of processing and providing includes compensating the pulse height with the zero offset according to the temperature.

In Example 15, the subject matter of Example 14 optionally includes the step of processing and providing comprising adjusting an energy resolution of the output by compensating the pulse height with a broadened pulse width.

In Example 16, the subject matter of one or any combination of Examples 13-15 optionally includes the adjusting the gain including adjusting the gain of an amplifier configured to process the energy signal.

In Example 17, the subject matter of one or any combination of Examples 12-16 optionally includes the step of measuring temperature being conducted by using a temperature sensor.

In Example 18, the subject matter of one or any combination of Examples 12-17 optionally includes a step of generating the source X-rays.

Example 19 can include subject matter or can optionally be combined with one or any combination of Examples 1-18 to include such subject matter, comprising a computer readable storage medium including executable instructions which, when executed by a processor, cause the processor to perform acts comprising detect a secondary X-ray from a test object irradiated by source X-rays; provide a corresponding energy signal; measure a temperature related to the detector; and process the energy signal and provide a temperature compensated output for an X-ray event.

In Example 20 the subject matter of claim 19 optionally includes a computer readable storage medium including executable instructions to cause the processor to provide an energy signal including a pulse having a pulse height according to the temperature and the pulse includes a zero offset caused by temperature-induced pulse-leakage of the detector, and provide a temperature compensated output that includes compensation of the pulse height with the zero offset according to the temperature.

These non-limiting Examples can be combined in any permutation. In example implementations of the present invention, processing may be implemented in hardware, firmware, software, or a combination of any of hardware, firmware, and software. For example, processing may be implemented in computer programs executed on programmable computers/machines that each includes a processor, a storage medium or other article of manufacture that is readable by the processor (including volatile and non-volatile memory and/or storage elements), at least one input device, and one or more output devices. In certain implementations of the present invention, program code may be applied to data entered using an input device to perform processing and to generate output information.

Various exemplary implementations of the present invention have been described with reference to the preceding drawings only as exemplary implementations and the scope of the invention is limited only by the claims. These exemplary implementations are provided only for enabling those skilled in the art to better understand and then further implement the present invention and are not intended to limit the scope of the present invention in any manner.

Further, example implementations of the present invention may be practiced according to the claims without some or all of the specific details of the described implementations. Therefore, the invention encompasses numerous alternative, modified, and equivalent implementations that may be conceived having a structure and method disclosed as herein and such alternative implementations may be used without departing from the principles of and within the scope of the appended claims.

For the purpose of clarity, technical material that is known in the technical fields related to the invention has not been described in detail so that the invention is not unnecessarily obscured. Accordingly, the above implementations of the present invention are to be considered as illustrative and not restrictive, and the invention is not to be limited to the details of the example implementations given herein but may be modified within the scope and equivalents of the appended claims.

Further, the terms "comprise(s)," "include(s)" and "have (s)" their derivatives and like expressions used herein should be understood to be open (i.e., "comprising/including, but not limited to"). The term "based on" means "at least in part based on", the term "one implementation" means "at least one implementation", and the term "another implementation" indicates "at least one further implementation". Relevant definitions of other terms have been provided in the present disclosure.

Although the present invention has been described in relation to particular implementations thereof, it can be appreciated that various designs can be conceived based on the teachings of the present disclosure, and all are within the scope of the present disclosure.

What is claimed is:

1. An X-ray analyzer comprising:
    at least one detector configured to detect a secondary X-ray from a test object irradiated by an X-ray source, and provide a corresponding energy signal, wherein the energy signal includes a pulse having a pulse height, and the pulse height includes an offset caused by temperature-induced pulse-leakage of the at least one detector;
    a temperature sensor configured to sense an ambient temperature related to the at least one detector; and
    a signal processor configured to process the energy signal and provide a temperature compensated output for an X-ray event according to the sensed ambient temperature, wherein the signal processor includes a temperature compensator configured to adjust gain of the pulse height according to the ambient temperature and compensate the offset of the pulse height according to the ambient temperature.

2. The X-ray analyzer of claim 1, wherein the temperature compensator is further configured to adjust an energy resolution of the output by compensating the pulse height with a broadened pulse width.

3. The X-ray analyzer of claim 1, wherein the temperature compensator further comprises calibration tables specifying a temperature dependence of the gain and a temperature dependence of the offset.

4. The X-ray analyzer of claim 3, wherein the calibration tables are empirically derived in a calibration procedure in which the test object and the pulse height at a calibration temperature are known.

5. The X-ray analyzer of claim 1, wherein the signal processor includes a pre-amplifier which is in thermal contact with the at least one detector, and configured to produce the pulse, and wherein the ambient temperature is an ambient temperature of the pre-amplifier and the adjusted gain is a pre-amplifier gain.

6. The X-ray analyzer of claim 1, wherein the signal processor includes a pre-amplifier and a secondary stage amplifier configured to contribute to the gain and to producing the pulse, wherein the secondary stage amplifier is in contact with a second temperature sensor measuring a second temperature.

7. The X-ray analyzer of claim 1, wherein the temperature sensor is in physical contact with the at least one detector.

8. The X-ray analyzer of claim 1 further comprising the X-ray source.

9. A method of providing X-ray testing, the method comprising the steps of:
   detecting a secondary X-ray from a test object irradiated by X-rays from an X-ray source;
   providing a corresponding energy signal, wherein the energy signal includes a pulse having a pulse height, and the pulse height includes a zero offset caused by temperature-induced pulse-leakage of a detector of the secondary X-ray;
   measuring an ambient temperature related to the detector of the secondary X-ray; and
   processing the energy signal and providing a temperature compensated output for an X-ray event according to the measured ambient temperature, including adjusting gain of the pulse height according to the ambient temperature and compensating the zero offset of the pulse height according to the ambient temperature.

10. The method of claim 9, wherein the step of processing and providing comprises adjusting an energy resolution of the output by compensating the pulse height with a broadened pulse width.

11. The method of claim 9, wherein the adjusting of the gain is to adjust the gain of an amplifier configured to process the energy signal, and wherein the measuring the ambient temperature is to measure the ambient temperature of the amplifier.

12. The method of claim 9, wherein the step of measuring temperature is conducted by using a temperature sensor.

13. The method of claim 9, further comprising a step of generating the X-rays from the X-ray source.

14. A non-transitory computer readable storage medium comprising executable instructions which, when executed by a processor of an X-ray analyzer, cause the X-ray analyzer to:
   detect a secondary X-ray from a test object irradiated by X-rays of an X-ray source;
   provide a corresponding energy signal, wherein the energy signal includes a pulse having a pulse height, and the pulse height includes a zero offset caused by temperature-induced pulse-leakage of a detector of the secondary X-ray;
   measure an ambient temperature related to the detector of the secondary X-ray; and
   process the energy signal to produce a temperature compensated output for an X-ray event, including adjust gain of the pulse height according to the ambient temperature and compensate the zero offset of the pulse height according to the ambient temperature; and
   provide the temperature compensated output for the X-ray event according to the measured ambient temperature.

* * * * *